(12) United States Patent
Greenspan

(10) Patent No.: US 7,831,337 B2
(45) Date of Patent: Nov. 9, 2010

(54) METHOD AND APPARATUS FOR POSITIONAL ERROR CORRECTION IN A ROBOTIC POOL SYSTEMS USING A CUE-ALIGNED LOCAL CAMERA

(76) Inventor: Michael Greenspan, 79 Jane Avenue, Kingston (CA) K7M 3G7

( * ) Notice: Subject to any disclaimer, the term of this patent is extended or adjusted under 35 U.S.C. 154(b) by 1356 days.

(21) Appl. No.: 11/233,375

(22) Filed: Sep. 23, 2005

(65) Prior Publication Data

US 2006/0063599 A1    Mar. 23, 2006

Related U.S. Application Data

(60) Provisional application No. 60/612,247, filed on Sep. 23, 2004.

(51) Int. Cl.
*G05B 19/00* (2006.01)
(52) U.S. Cl. ............................. 700/245; 473/1; 473/45; 901/47
(58) Field of Classification Search ................. 701/245; 901/47; 473/1, 45
See application file for complete search history.

(56) References Cited

OTHER PUBLICATIONS

Long, Robotic Pool: An Experiment in Automatic Potting, Department of Electrical and Computer Engineering, University of Waterlooo, Canada, pp. 1-6.*

Alian et al., "Roboshark: a gantry pool player robot", Computer Eng. Dept, Sharif University of Tech, Tehran, Iran , 5 pages.
Chua et al., "Pool Balls Identification and Calibration for a Pool Robot", Faculty of Eng. & Tech., Multimedia University, Jalan Ayer Keroh Lama, Melaka, Malaysia, 4 pages.
Larsen et al. "The Automated Pool Trainer—a Multi Modal System for Learning the Game of Pool", Center for PersonKommunikation, Aalborg University, Aalborg, Denmark, 6 pages.
Sang et al., "Automating Skills Using a Robot Snooker Player", Dept. of Mech. Eng., University of Bristol, Apr. 1994, 142 pages.

* cited by examiner

*Primary Examiner*—Khoi Tran
*Assistant Examiner*—Nikhil Sriraman
(74) *Attorney, Agent, or Firm*—Lynn C. Schumacher; Hill & Schumacher

(57) ABSTRACT

The present invention provides a method and apparatus for accurately positioning a robotic pool-playing device. The system comprises a computer controlled robotic positioning device, such as a gantry robot, that can position a cue over the pool table and place a shot. A global camera is mounted on the ceiling looking down at the table, and the acquired images are transmitted to the computer for analysis to determine the identity and locations of the balls within the table coordinate reference frame. The computer also automatically determines which ball to strike. An aspect of the invention is the use of a local camera, mounted on or near the robotic end-effector in a fixed relationship with the cue, to improve the positioning error of the robotic device prior to placing a shot. By comparing the ball locations perceived from the vantage of the local camera with the known ball locations determined from the global camera image, the invention can calculate the acquired robotic positioning error, which can then be corrected for prior to placing the shot.

3 Claims, 4 Drawing Sheets

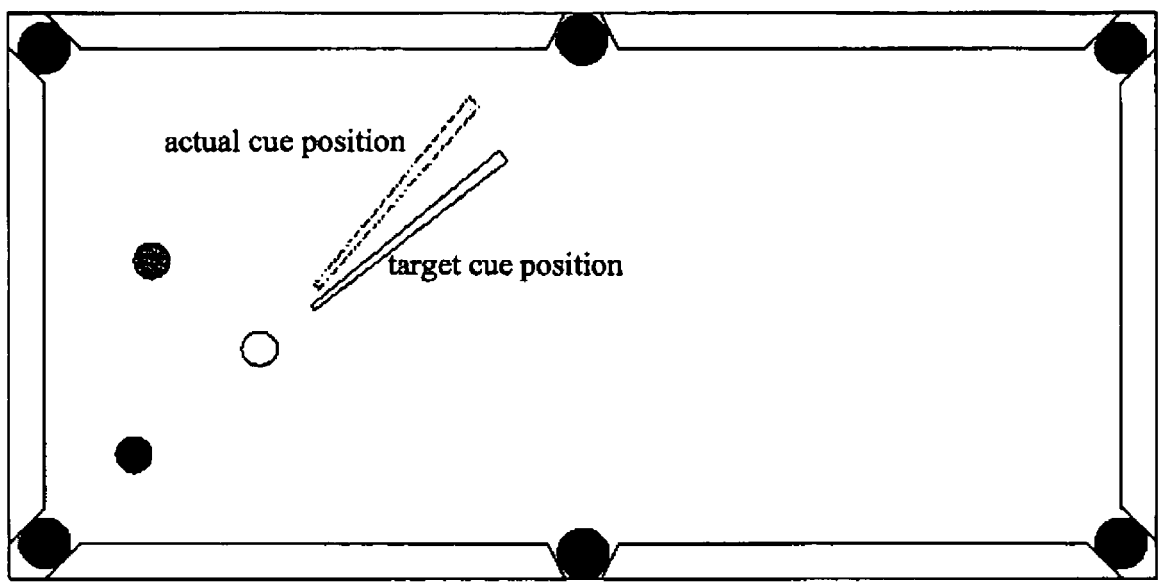
Figure 3: Global Camera Vantage

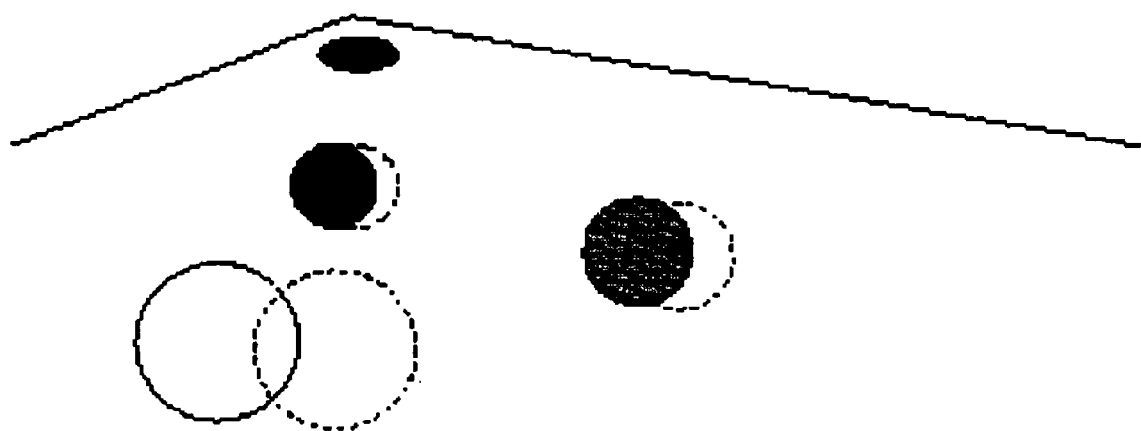
(a) local camera vantage, with expected and actual ball positions
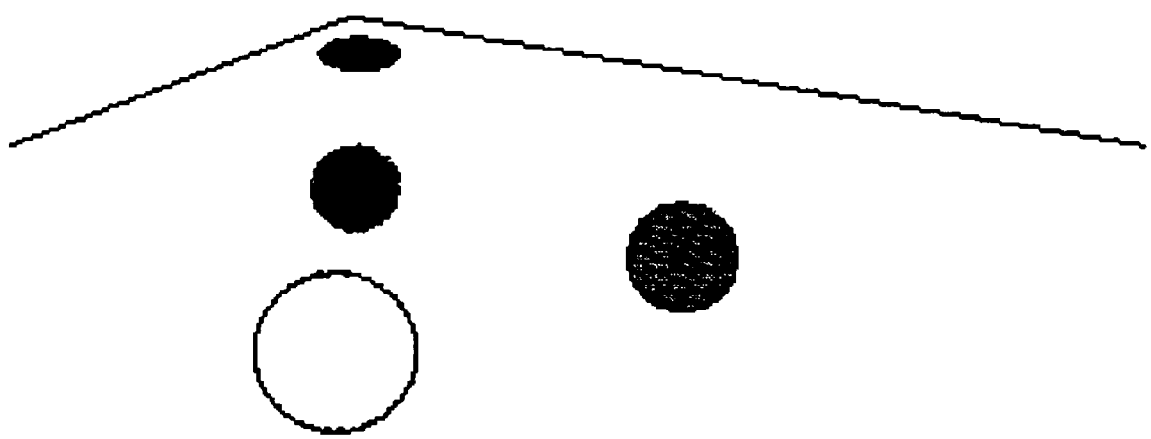
(b) local camera vantage after error correction
Figure 4: Local Camera Vantage

METHOD AND APPARATUS FOR POSITIONAL ERROR CORRECTION IN A ROBOTIC POOL SYSTEMS USING A CUE-ALIGNED LOCAL CAMERA

CROSS REFERENCE TO RELATED APPLICATION

This patent application relates to, and claims the priority benefit from, U.S. Provisional Patent Application Ser. No. 60/612,247 filed on Sep. 23, 2004 entitled METHOD AND APPARATUS FOR POSITIONAL ERROR CORRECTION IN A ROBOTIC POOL SYSTEM USING A CUE-ALIGNED LOCAL CAMERA, and which is incorporated herein in its entirety.

FIELD OF THE INVENTION

This invention relates generally to the field of robotically controlled games, and more particularly the present invention relates to a method and apparatus for robotically controlled pool games.

BACKGROUND OF THE INVENTION

The cue sports include pool, billiards, and snooker, and have recently enjoyed a surge in popularity worldwide. There have been a number of efforts at developing automation aids for these games. One example is the Instant Pool Trainer [Lar01], in which a camera is mounted on the ceiling aimed down at the table. Acquired images are transmitted to a computer and automatically analysed using image processing techniques. The system makes suggestions to the human trainee about the next shot to place, the desired angle of the cue, etc.

Other systems have attempted to fully automate the play by adding a robotic component [Nak01, Qi99, Shu94, Chu02, Ali04, Lon04, Che04]. In addition to the ceiling-mounted camera, these systems involve some form of computer-controlled robotic actuation device that can position a cue to the correct location and place a shot. The most common example of such robotic devices are gantry systems [Ali04, Lon04, Che04, Shu94], the first of which was proposed by Shu et al. [Shu94]. Other proposed robotic devices include a mobile robot that moves around the perimeter of the table and extends a cue-like end-effector to place a shot [Qi99], and a mobile robot that moves over the surface of the table [Lar02].

The cue sports demand a high degree of positional accuracy when placing a shot, and one of the main challenges of a robotic system is to position the cue to the desired location with sufficient accuracy. The exact positional accuracy that is required to play well has not been reported in the literature, and is presumed to be unknown, although it is likely to be on the order of 0.1 mm or finer. Whereas mechanical devices can be positioned very precisely, both sensor errors and robot calibration contribute to limitations to positioning accuracy of such systems.

In the above cases where overhead cameras are the primary sensor to resolve position, a limitation to accuracy is sensor resolution. Standard CCD cameras that are suitable for machine vision applications will often have 640×480 pixels. If the entire length of a standard pool table extends the complete 640 pixels, then this resolves to ~4 mm/pixel, which is at least an order of magnitude too coarse. Using higher pixel-count sensors, or multiple cameras, are possible remedies. In the case of multiple sensors, each of which images a smaller region of the table at a higher magnification, combining the partial images acquired by each individual sensor into a global coordinate frame requires accurate calibration of the extrinsic camera parameters. Radial distortions in the optical systems also limit the accuracy of the cameras. A further limitation is that, from the overhead vantage, the table appears as a 2-D plane, and vertical displacements of the cue (i.e., normal to the camera place) cannot be perceived. Controlling these vertical displacement to allow the system to strike the cue ball high or low forms an important part of the play.

The main limitation to positional accuracy is calibration of the robotic device [Lon04]. The proper calibration of robotic devices to ensure positional accuracy is a well-known and challenging problem. The majority of robotic devices are equipped with joint encoders that very precisely measure the location of each revolute or translational joint. Despite their precision, converting these joint values into an accurate position of the robotic end-effector is not straightforward, as there are a number of factors that cannot be directly measured which affect the overall accuracy. The majority of industrial robotic devices do not require absolute positioning accuracy, so long as they are precise and repeatable, so this limitation on accuracy does not present a barrier to use in many cases. An exception where absolute positioning accuracy is required are Coordinate Measurement Machines (CMMs). These devices are finely machined and calibrated so that they can be used in metrological inspection applications. The delicate mechanisms used in CMM construction would unfortunately not be able to withstand a significant load or impact, such as striking a ball.

In human play, it is an accepted practice to accurately align the cue prior to a shot by locating the eye closely to the axis of the cue [Kan99]. From this vantage, the locations of both the cue ball (which is to be impacted by the cue) and the object ball (which is to be impacted by the cue ball) can be seen. Small positional variations of the cue axis as well as of the tip of the cue can be perceived accurately, as they are parallel to the human's retinal plane. Conversely, motions that are perpendicular to the retinal plane, such as those parallel to the cue axis, are less easily resolved, and are fortunately less important to accurate shot placement.

Therefore, there is a need to provide a robotically controlled pool game which overcomes the aforementioned shortcomings.

SUMMARY OF INVENTION

The present invention provides a method and apparatus for accurately positioning a robotic pool-playing device. The system comprises a computer controlled robotic positioning device, such as a gantry robot, that can position a cue over the pool table and place a shot. A global camera is mounted on the ceiling looking down at the table, and the acquired images are transmitted to the computer for analysis to determine the identity and locations of the balls within the table coordinate reference frame. The computer also automatically determines which ball to strike.

The invention may use a local camera, mounted on or near the robotic end-effector in a fixed relationship with the cue, to improve the positioning error of the robotic device prior to placing a shot. By comparing the ball locations perceived from the vantage of the local camera with the known ball locations determined from the global camera image, the invention can calculate the acquired robotic positioning error, which can then be corrected for prior to placing the shot.

Thus, in one aspect of the invention there is provided a method of playing pool, comprising the steps of:

a) acquiring an image of a pool table using a first camera placed above the pool table and positioned that its image plane is substantially parallel to both a playing surface of the pool table and a longitudinal axis of a pool cue and transmitting this image to a computer processing means for analysis, the result of which is a determination of the position and identity of each pool ball on the pool table;

b) said computer processing means planning a shot of a cue ball by the pool cue by calculating a desired position of the pool cue with respect to the cue ball in a pool table frame of reference including a tip position of said pool cue and orientation of the longitudinal axis of the pool cue;

c) said computer processing means instructing said robot connected to said pool cue to position the pool cue to a preferred location from which to place a shot; and d) said computer processing means instructing the robot to place a shot.

In another aspect of the present invention there is provided a method of playing pool, comprising the steps of;

a) acquiring an image of a pool table using a camera mounted on the robotic end-effector so that its image plane is substantially perpendicular to a longitudinal axis of the pool cue, the position of said camera being fixed with respect to the longitudinal axis of the pool cue, transmitting the image to a computer processing means for analysis, the result of which is a determination of the position and identity of each ball on the pool table within this image within a frame of reference of the camera, and correcting for any errors based upon the relative position of the cue axis and the cue ball;

b) said computer processing means planning a shot of a cue ball by the pool cue by calculating a desired position of the cue with respect to the cue ball; and c) said computer processing means instructing the robot connected to said pool cue to place a shot.

The present invention also provides an apparatus for playing pool, comprising:

a) a robot having a robotic arm with an end effector, the robot mounted on a gantry for movement above a pool table, a pool cue attached to the end-effector, the pool cue having a longitudinal axis;

b) a first image capturing means mounted above the pool table for acquiring an image of the pool table and positioned such that its image plane is substantially parallel to both a playing surface of the pool table and said longitudinal axis of said pool cue;

c) a second image capturing means mounted on the robotic end-effector so that its image plane is substantially perpendicular to the longitudinal axis of the pool cue for capturing an image of a pool table using a camera, the position of said camera being fixed with respect to the longitudinal axis of the pool cue;

d) a computer processing means connected to the first image capturing means for analysis of the images transmitted thereto from the image capturing means, the computer processing means including means for determining a position and identity of each pool ball on the pool table within this image within a frame of reference of the image capturing means, said computer processing means including means for planning a shot of a cue ball by the pool cue by calculating a desired position of the cue with respect to the cue ball; and e) a robotic controller connected to said computer processing means for instructing the robot to place pool shots with the cue.

In this aspect of the invention the apparatus may include a second image capturing means mounted on the robotic end-effector so that its image plane is substantially perpendicular to the longitudinal axis of the pool cue for capturing an image of a pool table using a camera, the position of said camera being fixed with respect to the longitudinal axis of the pool cue.

The present invention also provides an apparatus for playing pool, comprising;

a) a robot having a robotic arm with an end effector, the robot mounted on a gantry for movement above a pool table, a pool cue attached to the end-effector, the cue having a longitudinal axis;

b) image capturing means mounted on the robotic end-effector so that its image plane is substantially perpendicular to a longitudinal axis of the pool cue for capturing an image of a pool table using a camera, the position of said camera being fixed with respect to the longitudinal axis of the pool cue, c) a computer processing means for analysis of the images transmitted thereto from the image capturing means, the result of which is a determination of the position and identity of each ball on the pool table within this image within a frame of reference of the camera, and correcting for any errors based upon the relative position of the cue axis and the cue ball, said computer processing means planning a shot of a cue ball by the pool cue by calculating a desired position of the cue with respect to the cue ball; and d) a robotic controller connected to said computer processing means for instructing the robot to place pool shots with the cue.

BRIEF DESCRIPTION OF DRAWINGS

The following is a description, by way of example only, of the method in accordance with the present invention, reference being had to the accompanying drawings, in which:

FIG. 3 shows a top global view of the pool table as taken from the vantage point of a first overhead camera;

FIG. 4(a) shows a first local camera view from a second local camera showing expected and actual pool ball positions; and FIG. 4(b) shows a second local camera view from the overhead camera.

DETAILED DESCRIPTION OF THE INVENTION

Figure 1:
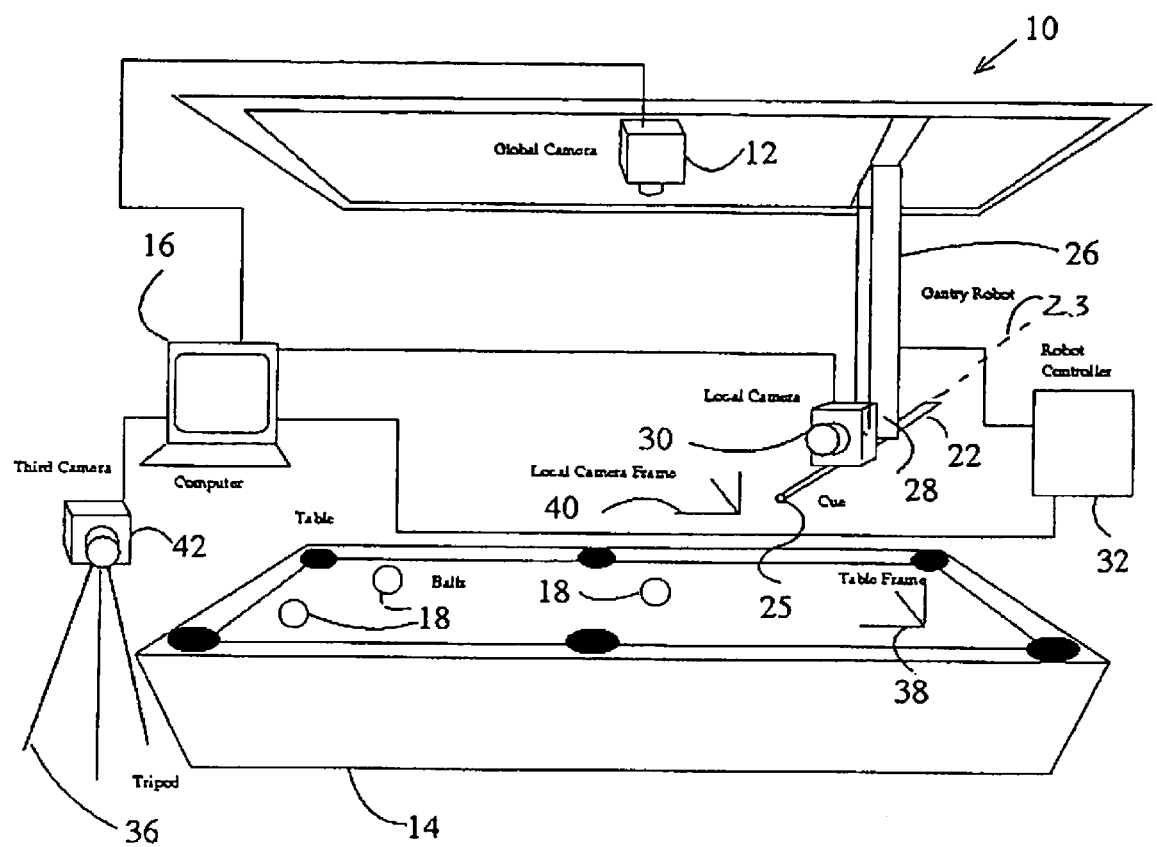
FIG. 1 is a diagram of a computer controlled pool game showing the system components with labeled coordinate frames.

The apparatus and method of the present invention utilizes at least one, or two machine vision systems. Illustrations of the system are shown generally at 10 in FIGS. 1 and 2.

In one embodiment of the invention a single, global overhead camera is used. In this embodiment the system 10 uses global overhead camera 12 for acquiring an image of pool table 14 with camera 12 being placed above the pool table 14 and positioned such that its image plane is substantially parallel to both the pool table 14 and a longitudinal axis 23 of pool cue 22 and transmitting this image to a computer 16 for analysis, the result of which is a determination of the position and identity of each ball 18 on the pool table 14.

Another computer program is used to plan a shot, which indicates a desired position of the cue 22 with respect to the cue ball in the table frame. The gantry robot 26 mounted above the pool table 14 is controlled by a robotic controller 32 that communicates with a computer 16 and the cue 22 is attached to the end-effector 28 whereby the cue is robotically controlled.

The shot planning computer program analyses the positions of the balls 18 on the table, and uses geometric and physics computations to determine the likelihood of sinking each target ball 18. Depending upon the arrangement of balls 18 on the pool table 14, some balls may be impossible to sink, whereas other balls may have a number of possible shots. The program not only considers the current arrangement of balls 18 on table 14, but also predicts the resulting arrangement of the balls 18 subsequent to placing each shot. The determination of which shot to place will therefore also include the most favorable positioning of remaining balls 18 in future shots.

Once the most favorable shot has been determined, the desired cue 22 position to place that shot is transmitted from the computer 16 to the robotic controller 32 to reposition the cue 22. The desired cue position includes not only the tip position 25 of cue 22, but also the orientation of the cue axis 23. The robotic system is then invoked to reposition the cue to the desired cue position, and place a shot.

One of the main challenges is that the pool games require a high degree of positioning accuracy over a large area. It is possible to design and calibrate a robotic system that is highly accurate (such as a CMM machine), but for a variety of reasons (ruggedness, cost) it is more desirable for us to use a standard robotic gantry that is inherently inaccurate. As an example, it is not uncommon for gantry robots to have accuracies only on the order of 0.01 m, which is clearly far too coarse to play a reasonable game of pool.

Thus, in repositioning the cue 22, the robotic system may accumulate error, as illustrated in FIG. 3. The actual position of cue 22 may therefore not be perfectly accurate, but rather includes some degree of positional error, which will degrade the performance of the system. In order to compensate for the accumulated positional error, another embodiment the system comprises two cameras, the global camera 12 mounted on the ceiling aimed down at the table 14 and another camera 30 mounted on the end-effector (or cue 22) so that its image plane is substantially perpendicular to the cue axis 23. It is difficult to position the camera 30 so that it is exactly perpendicular to the cue axis 23. It is also unnecessary, as nearly perpendicular is sufficient.

Generally in this embodiment the apparatus for playing billiards can accurately position the inherently inaccurate gantry mechanism by making use of information from both vision systems 12 and 30. First, the camera 12 determines the ball identities and locations accurately, and the planning system identifies a shot. The gantry robot 26 then moves the cue 22 into position to place the shot, and in doing so, accumulates error, so that the position of the cue 22 is inaccurate. To improve the cue accuracy, the camera 30 next acquires an image, and extracts the locations of landmarks (i.e., balls) from its own vantage. By comparing the location of the landmarks in the frame of reference of camera 30 with those in the frame of reference of camera 12, and given prior knowledge of the cue location in the frame of reference of camera 30, the error in the gantry robot 26 position can be estimated, and its position refined. In this way, the use of two cameras can be used to accurately position an inherently inaccurate positioning device.

Another possibility is to use landmarks (or targets) other than the pool ball positions to estimate and correct for the robot positioning error. In a preprocessing step, a number of targets, such as identifiable planar patterns, can be positioned at specific accurate locations with respect to the pool table. Their positions can therefore be identified within the frame of reference of the overhead camera 12. Once the cue 22 has been positioned, then the target locations can be identified within the frame of reference of the end-effector mounted camera 30, and the positional error of the cue 22 can then be estimated.

We assume that all ball 18 and "robot position(s)" are expressed in some global coordinate frame, which we shall call the table frame 38. It will be appreciated by those skilled in the art that due to the characteristics of the robotic mechanism, this "robotic position(s)" can be equivalently expressed in other terms without any ambiguity, i.e., as robot joint values, or as the position of certain other points on the robotic end effector. We therefore often talk about robotic positions in a slightly more general sense.

Figure 2:
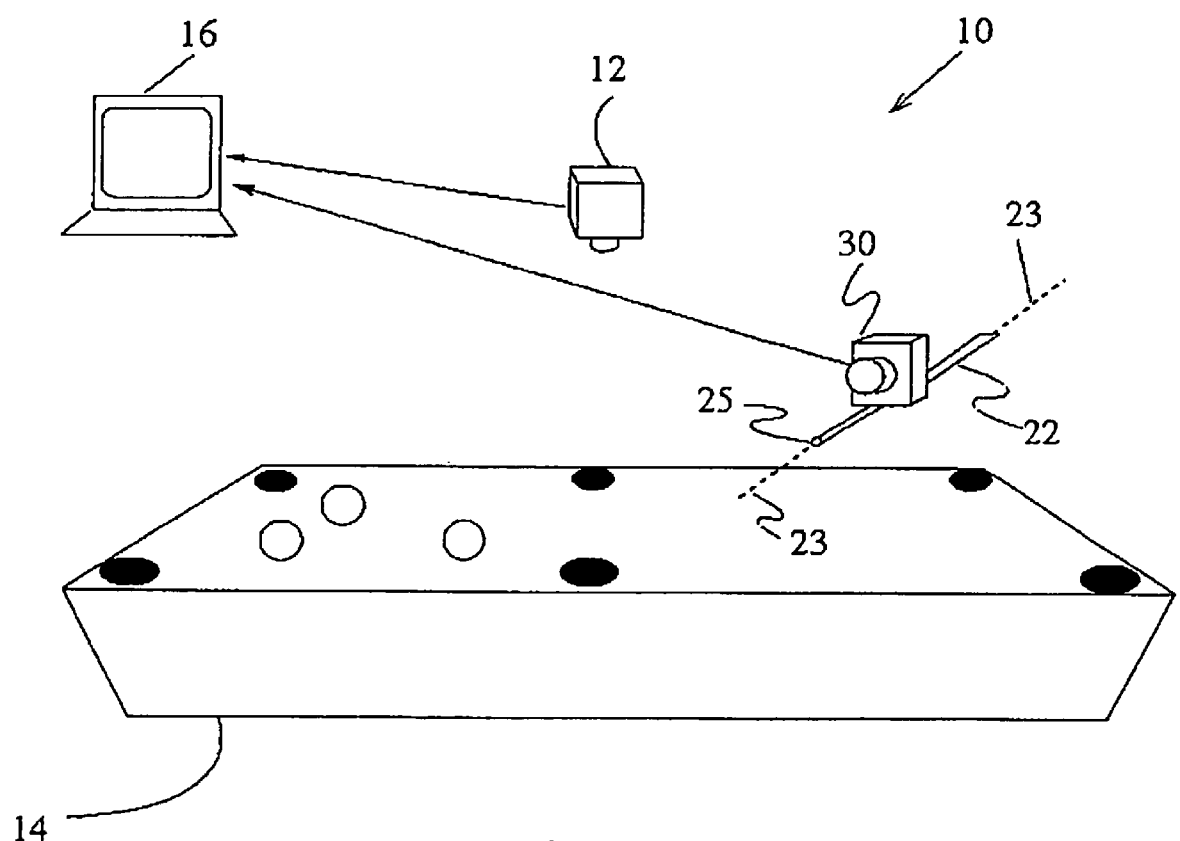
FIG. 2 shows the system components of the computer controlled pool game.

The position of this camera 30 is fixed with respect to the longitudinal axis 23 of the cue, and the location of the cue axis 23 within the coordinate reference frame 40 of the local camera 30 is determined in a pre-processing step, which uses a third camera 42 (shown in FIG. 1). This third camera 42 is mounted on a tripod 36 such that its image plane is also substantially perpendicular to the cue axis 23. The cue 22 itself may be repositioned with one degree-of-freedom by sliding along the cue axis 23, and this is done repeatedly and the center of the cue tip 25 within the third camera 42 image is determined at each extreme cue position. By comparing the centers of the cue tip 25 at each extreme position, the angle between the cue axis 23 and the third camera 42 is computed. The robotic joints are then repositioned so as to improve the perpendicularity of the cue axis 23 with the image plane of the third camera 42, and the process iterates.

Once the cue 22 is thus positioned so that its axis 23 is accurately perpendicular to the image plane of the third camera 42, the relative locations of the third camera 42 and the local camera 30 (which are substantially parallel) are then determined by estimating the rigid transformation that relates them, and the cue 22 location is then directly propagated to the local camera 30 coordinate reference frame.

The rigid transformation that relates the relative locations of the third camera 42 and the local camera 30 can be determined by first calibrating the intrinsic parameters of each of these two cameras, and then acquiring images of a common planar target of a known dimension from both cameras. The locations of features on the planar target can be used to determine the rigid transformation between the cameras, as disclosed in [Zha98].

After the cue 22 is repositioned, and before placing a shot, an image is acquired from the vantage of the local camera 30. This image is transmitted to the computer 16 and the locations of the balls 18 within this image are determined within the frame of reference of local camera 30. If at least three balls 18 are visible from both the global camera 12 and local camera 30, then the accumulated positional error of the robotic system can be estimated and corrected for.

For each ball 18, a ray can be inscribed between the optical center of one of the cameras 12 or 30 and the center of the ball 18. With three balls 18 and two cameras 12 and 30, there are a total of six such rays, i.e., three rays for each camera. By establishing the correct correspondence between pairs of rays from each respective camera, the relative positions of both cameras, with respect to each other can be determined. Equivalently, if the positions of the balls 18 and the global camera 12 are known within the table 14 coordinate reference frame, then the position of the local camera 30 can be determined with respect to the balls 18.

If there are more than three balls 18 in the scene, then the solution is over-determined, such that more than one solution exists. In this case, the position of the local camera 30 can be determined from the set of possible solutions using least squares estimation methods, such as singular value decomposition. If there are less than three balls 18, then the solution is underdetermined, such that not all position parameters (i.e. dimensions) can be solved. Even in the underdetermined case, it is still possible to estimate and correct some dimensions of the positional error using this technique. For example, with two balls 18, the positional error can be corrected up to a twist around the cue axis 23. With only one ball 18, the translational error can be corrected, although the direction of the shot may still contain errors. In these last two cases, it is also possible to reposition the end-effector so that the local camera 30 which is rigidly mounted to the end-effector is also repositioned so that the local camera 30 can view a sufficient number of balls 18. As small motions of the robotic device only accumulate small amounts of error, the cue 22 can then be repositioned accurately to place the desired shot.

An example of the process of error correction is illustrated in FIGS. 4(a) and 4(b). FIG. 4(a) shows the true and desired ball locations from the vantage of the local vision system image. It can be seen that positional error causes the true ball positions to differ from the desired ball positions. FIG. 4(b) shows the true ball locations after the positional error has been corrected. After correction, the true ball positions align more accurately with the desired ball positions, leading to a more successful shot.

Another possible way to make use of the local vision system to improve accuracy is to first position the robot so that the cue 22 is at an ideal location with respect to the cue ball 18' and object balls. In this position, a cue ball 18' when struck by the cue 22 will then proceed to strike an object ball 18" so that the trajectories traversed by the cue ball 18' (prior to striking the object ball) and the object ball 18" (after it has been struck by the cue ball 18') are collinear. This represents a straight shot, and any other shot can be achieved by first orienting the cue 18 in this position, and then perturbing it slightly to a desired angle and offset. The locations in the local camera 30 reference frame of the cue ball 18' and object balls 18" for an ideal straight shot can be recorded. In subsequent shots, the robot joints can be positioned so that the cue ball 18' and object ball 18" fall in these previously recorded positions within the local camera 30 reference frame, thereby ensuring that the cue 22 is in the ideal position for a straight shot.

Utilizing an end-effector mounted camera is known in the robotic literature as an eye-in-hand system. There have been a number of such systems proposed to improve robotic accuracy for grasping and other operations, including some work that includes combinations of both end-effector mounted and global cameras [Fla00]. Despite the great interest and prior work in robotic pool, the use of a global camera 30 parallel to the table 14 plane in combination with a local camera 30 perpendicular to the cue axis 23 has not been previously proposed, and is advantageous and novel to this invention.

Another embodiment of the present invention utilizes only the local camera 30 to determine the quality of the cue 22 position solely with respect to the vantage of the local camera 30 image. In this application, the cue 22 is controlled by either a human or a robot, and the image would be transmitted, possibly wirelessly, to a computer. The cue 22 position is determined with respect to the imaged balls 18 as either good quality or poor quality, and this information is communicated back to the positioning device for refinement. While the vantage of the local camera 30 alone is more limited than that of the combination of local camera 30 and global camera 12, the flexibility of providing a self-contained cue 22 allows it to be used for human training as well as robotic play.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

[Lar01] Larsen, L. B., Jensen, P. M., Kammersgaard, K., Kromann, L., "The Automated Pool Trainer—A multi modal system for learning the game of Pool", *Intelligent Multi Media, Computing and Communications: Technologies and Applications of the Future*. John Wiley and Sons, pp. 90-96, June 2001.

[Kan99] Kanov, Gerry, and Stauch, Shari, "Precision Pool", Human Kinetics, ISBN 0-88011-897-0, 1999.

[Nak01] Nakama, H., Tokashiki, H., "The Development of the Autonomous Billiard Robot", *Bull. Fac. Eng. Univ. Ryukus (Japan)*, no. 61, pp. 105-108, March 2001.

[Qi99] Bingchen Qi, and Okawa, Y., "Building an Intelligent Mobile Plafform for Billiards", *Proc. 30th Intl. Sym. Rob.*, Tokyo, pp. 605-612, 27-29 Oct. 1999.

[Shu94] Shu Sang, W. C., "Automating Skills Using a Robot Snooker Player", *PhD Thesis*, Bristol University, U.K., April 1994.

[Chu02] S. C. Chua, E. K. Wong, Alan W. C. Tan, and V. C. Koo. "Decision algorithm for pool using fuzzy system", *iCAiET 2002: Intl. Conf. AI in Eng. & Tech.*, pp 370-375, June 2002.

[Ali04] Mohammad Ebne Alian, Saeed Bagheri Shouraki, M. T. Manzuri Shalmani, Pooya Kaimian, Payam Sabmeydani, "Roboshark: a gantry pool player robot", *ISR 2004: 35th International Symposium of Robotics*, Paris-Nord Villepinte, France, 23-26 Mar., 2004.

[Lon04] Fei Long, Johan Herland, Marie-Christine Tessier, Darryl Naulls, Andrew Roth, Gerhard Roth, Michael Greenspan, "Robotic Pool: An Experiment in Automatic Potting", accepted in IROS'04, Sendai, Japan, Sep. 28-Oct. 2, 2004.

[Lar02] James Larson, "Scratchy: An Autonomous Pool-Playing Robot", http://www.mil.ufl.edu/imdl/papers/IMDL Report Fall 02/larson_james/scratchy.pdf

[Den04] H. Denman, N. Rea, A. Kokaram, "Content-based analysis for video from snooker broadcasts", *Computer Vision and Image Understanding*, no. 92, pp. 176-195, 2003.

[Fla00] Gregory Flandin, Francois Chaumette, Eric Marchand, "Eye-in-hand/Eye-to-hand Cooperation for Visual Servoing", ICRA2000: *IEEE International Conference on Robotics and Automation*, San Francisco, April 2000

[Che04] B. Cheng, J. Li, and J. Yang, "Design of the Neural-Fuzzy Compensator for a Billiard Robot." *IEEE Intl. Conf. Networking, Sensing & Control*, pp. 909-913, 2004.

[Zha98] Z. Zhang, "A Flexible New Technique for Camera Calibration", Microsoft Research Technical Resport MSR-TR-98-7, Dec. 2, 1998.

Therefore what is claimed is:

1. An apparatus for playing pool, comprising;
   a) a robot having a robotic arm with an end effector, the robot mounted on a gantry for movement above a pool table, a pool cue attached to the end-effector, the pool cue having a longitudinal axis;

b) a first image capturing means mounted above the pool table for acquiring an image of the pool table and positioned such that its image plane is substantially parallel to both a playing surface of the pool table and said longitudinal axis of said pool cue;

c) a second image capturing means mounted on the robotic end-effector so that its image plane is substantially perpendicular to the longitudinal axis of the pool cue for capturing an image of a pool table using a camera, the position of said camera being fixed with respect to the longitudinal axis of the pool cue;

d) a computer processing means connected to the first image capturing means for analysis of the images transmitted thereto from the image capturing means, the computer processing means including means for determining a position and identity of each pool ball on the pool table within this image within a frame of reference of the image capturing means, said computer processing means including means for planning a shot of a cue ball by the pool cue by calculating a desired position of the cue with respect to the cue ball; and e) a robotic controller connected to said computer processing means for instructing the robot to place pool shots with the cue.

2. The apparatus for playing pool according to claim 1 including landmarks positioned at specific locations with respect to the pool table wherein the positions of the landmarks can therefore be identified within the frame of reference of the first image capturing means, whereby the computer processing means is further connected to the second image capturing means, and once the cue has been positioned, then the landmark locations can be identified within the frame of reference of the second image capturing means, and a positional error of the cue can then be estimated.

3. The apparatus according to claim 2 wherein locations of the landmarks have been predetermined with respect to the frame of reference of the first image capturing means.

* * * * *